(12) United States Patent
Larsen, II et al.

(10) Patent No.: US 12,480,602 B2
(45) Date of Patent: Nov. 25, 2025

(54) CABLE/TUBULAR CLAMP AND SYSTEM USING THE SAME

(71) Applicant: Channel Master, LLC, Chandler, AZ (US)

(72) Inventors: Anthony John Larsen, II, Chandler, AZ (US); Jose Ramon Bingochea, II, Chandler, AZ (US)

(73) Assignee: CHANNEL MASTER, LLC, Chandler, AZ (US)

( * ) Notice: Subject to any disclaimer, the term of this patent is extended or adjusted under 35 U.S.C. 154(b) by 21 days.

(21) Appl. No.: 18/451,332

(22) Filed: Aug. 17, 2023

(65) Prior Publication Data

US 2025/0060050 A1     Feb. 20, 2025

(51) Int. Cl.
*F16L 3/02* (2006.01)
*H02G 3/00* (2006.01)

(52) U.S. Cl.
CPC . *F16L 3/02* (2013.01); *H02G 3/26* (2013.01)

(58) Field of Classification Search
CPC ................................ F16L 3/02; H02G 3/26
USPC ......................................................... 248/49
See application file for complete search history.

(56) References Cited

U.S. PATENT DOCUMENTS

| | | | | |
|---|---|---|---|---|
| 1,718,259 A * | 6/1929 | Scott | ...................... | F16L 3/1215 174/158 R |
| 2,942,314 A * | 6/1960 | Debner | ................. | F16B 7/0433 24/339 |
| 4,861,081 A * | 8/1989 | Satoh | ...................... | E05B 79/12 292/336.3 |
| 4,991,801 A * | 2/1991 | Trumbull | ................ | F16L 3/221 248/62 |
| 5,129,397 A * | 7/1992 | Jingu | ....................... | A61B 8/00 600/437 |
| 5,277,683 A * | 1/1994 | Wilkins | ............. | A63B 21/0552 482/121 |
| 5,301,917 A * | 4/1994 | Dyer | ......................... | F16L 3/23 248/68.1 |
| 5,639,049 A * | 6/1997 | Jennings | ................. | F16L 3/123 248/301 |
| 6,336,578 B1 * | 1/2002 | Maynard | .................... | A45F 5/02 224/904 |
| 6,629,927 B1 * | 10/2003 | Mesaros | ................ | A61B 50/13 600/437 |
| 6,631,876 B1 * | 10/2003 | Phillips | ...................... | F16B 2/22 248/74.2 |

(Continued)

*Primary Examiner* — Muhammad Ijaz
(74) *Attorney, Agent, or Firm* — Baker Botts L.L.P.

(57) ABSTRACT

A cable/tubular clamp includes a base having an upper surface, a front surface extending downward from a front edge of the upper surface, and a back surface extending downward from a back edge of the upper surface, an aperture extending through the base in a direction from the front to the back surface; a first clamp arm extending from the front edge in a direction toward the back edge with a space between the back edge and an extended end of the first clamp arm, and a second clamp arm extending from the back edge in a direction toward the front edge with a space between the front edge and an extended end of the second clamp arm. The first clamp arm and the second clamp arm are sized to receive a cable or tubular through the spaces and to hold the cable or tubular against the base.

18 Claims, 5 Drawing Sheets

(56) References Cited

U.S. PATENT DOCUMENTS

| | | | | |
|---|---|---|---|---|
| 6,643,900 B2 * | 11/2003 | Jahrling | A47B 88/43 24/339 |
| 6,802,480 B1 * | 10/2004 | Martello | F16L 3/237 24/373 |
| 7,407,138 B1 * | 8/2008 | Gretz | F16L 3/233 248/68.1 |
| D578,383 S * | 10/2008 | Adams | D8/367 |
| 7,817,444 B2 * | 10/2010 | Dennes | H04Q 1/06 361/825 |
| 7,882,600 B2 * | 2/2011 | Judd | H02G 11/02 24/339 |
| 9,334,887 B2 * | 5/2016 | Leo, II | F16B 2/22 |
| 10,018,216 B1 * | 7/2018 | Espinosa | F16B 37/0814 |
| 10,240,820 B2 * | 3/2019 | Ash | F24S 25/636 |
| 10,450,751 B2 * | 10/2019 | Rush | E04C 5/167 |
| 11,446,477 B2 * | 9/2022 | Ignon | A61M 37/00 |
| 2003/0102412 A1 * | 6/2003 | Miescher | F16L 3/243 248/62 |
| 2004/0056158 A1 * | 3/2004 | Stuart | F16L 3/13 248/74.2 |
| 2008/0009728 A1 * | 1/2008 | Malchow | A61B 8/0841 600/562 |
| 2008/0132789 A1 * | 6/2008 | Malchow | A61B 8/0841 600/443 |
| 2009/0247877 A1 * | 10/2009 | Tanaka | G01S 15/899 600/462 |
| 2010/0102175 A1 * | 4/2010 | Dockery | H02G 3/32 248/62 |
| 2011/0201927 A1 * | 8/2011 | Hayakawa | A61B 8/46 600/437 |
| 2013/0146721 A1 * | 6/2013 | White | H02G 3/32 248/68.1 |
| 2015/0011872 A1 * | 1/2015 | Koh | A61B 8/5261 600/424 |
| 2015/0144744 A1 * | 5/2015 | Holtby | F16L 3/02 248/49 |
| 2016/0003375 A1 * | 1/2016 | Robertson, Jr. | E21F 17/02 248/341 |
| 2016/0076671 A1 * | 3/2016 | Lawrence | F16L 3/06 248/74.5 |
| 2016/0178089 A1 * | 6/2016 | Yadav | F16L 3/1222 248/74.2 |
| 2016/0355374 A1 * | 12/2016 | Sinnett | B65H 75/366 |
| 2018/0132822 A1 * | 5/2018 | Stankard | A61B 8/4433 |
| 2018/0256814 A1 * | 9/2018 | La Berge | F16B 45/00 |
| 2019/0154170 A1 * | 5/2019 | Geiger | H02G 3/30 |
| 2019/0269383 A1 * | 9/2019 | Wood | A61B 8/4405 |
| 2019/0356118 A1 * | 11/2019 | Capulli | H02G 3/045 |
| 2020/0011453 A1 * | 1/2020 | Allender-Zivic | F16L 3/06 |

\* cited by examiner

CABLE/TUBULAR CLAMP AND SYSTEM USING THE SAME

BACKGROUND

Cables are used in a wide variety of settings to provide power to devices from distant power sources and/or to provide communications between devices that are spaced apart. It is often desirable to secure cables so that they can be hidden from view, kept out of the way of foot traffic, and/or held without slack in the cable so that the cable cannot be easily moved or jostled. In outdoor settings in particular, it is desirable to secure a cable to a nearby structure such as a wall or flooring to prevent the cable from moving in the wind or presenting a trip hazard. Such outdoor cables are typically installed outside residential or commercial buildings by electricians or other professionals during the initial building phase. However, as new devices are installed (temporarily or permanently) around an existing building structure, new cables may be installed along the building structure as well. In addition, tubular devices such as pipes (e.g., PVC pipes) may be installed (temporarily or permanently) around an existing building structure to provide residential plumbing lines, water mister lines, and for various other applications. It is now recognized that a need exists for inexpensive, simple to install, and reliable devices for securing a cable or tubular device to a structure, such as an outdoor building structure.

SUMMARY OF THE INVENTION

One aspect of the invention is directed to a cable/tubular clamp comprising: a base having an upper surface, a front surface extending downward from a front edge of the upper surface, and a back surface extending downward from a back edge of the upper surface opposite the front edge; an aperture extending through the base in a direction from the front surface to the back surface; a first clamp arm extending from the front edge of the upper surface in a direction toward the back edge of the upper surface with a space between the back edge of the upper surface and an extended end of the first clamp arm; and a second clamp arm extending from the back edge of the upper surface in a direction toward the front edge of the upper surface with a space between the front edge of the upper surface and an extended end of the second clamp arm; wherein the first clamp arm and the second clamp arm are sized to receive a cable or tubular through the spaces and to hold the cable or tubular against the base.

Another aspect of the invention is directed to a system comprising: a cable or tubular; a cable/tubular clamp comprising: a base having an upper surface, a front surface extending downward from a front edge of the upper surface, and a back surface extending downward from a back edge of the upper surface opposite the front edge; an aperture extending through the base in a direction from the front surface to the back surface; a first clamp arm extending from the front edge of the upper surface in a direction toward the back edge of the upper surface with a space between the back edge of the upper surface and an extended end of the first clamp arm for receiving the cable or tubular into the first clamp arm; and a second clamp arm extending from the back edge of the upper surface in a direction toward the front edge of the upper surface with a space between the front edge of the upper surface and an extended end of the second clamp arm for receiving the cable or tubular into the second clamp arm; and a fastener configured to be received through the aperture to connect the cable/tubular clamp to a structure.

BRIEF DESCRIPTION OF THE DRAWINGS

Various embodiments are described in detail below with reference to the accompanying drawings, wherein like reference numerals represent like elements.

DESCRIPTION OF EMBODIMENTS

It can be difficult to install new devices that are powered by, or otherwise communicatively coupled to, a cable in indoor or outdoor locations. Not only does a user have to install the device, for example, along a building structure or using an appropriate mounting system, but the cable(s) then need to be secured so that they are hidden away from view, out of the way of foot traffic, and/or not hanging slack such that they can be easily tangled, jostled, or caught in the wind. Particularly for long-term or permanent installations, the cable should be securely fastened to one or more structures without a substantial amount of slack in the cable. Such cables may be installed by users who are not professional builders or electricians. Similar challenges may exist with installing equipment that requires a water source, where other tubular devices such as pipes (e.g., PEX pipe/tubing) need to be installed. Therefore, cable/tubular mounting solutions that are simple to install are needed.

The inventors recognized these problems and discovered an approach to cable/tubular mounting that uses one or more cable/tubular clamps, which can be easily deployed by a user without requiring the services of a skilled builder or electrician. In particular, the disclosed cable/tubular clamp (hereinafter referred to as "clamp") features a reversed direction clamping mechanism that securely holds a cable or tubular in place against the clamp for subsequent mounting of the clamp (and cable or tubular) to a structure. The clamp may be provided with a corresponding fastener, such as a threaded screw, making it simple to install using the fastener to attach the clamp (and cable or tubular) to the structure. The clamp may be sized for use with a particular size or type of cable or tubular and may be provided with the cable or tubular and the fastener as a kit.

Figure 1A:
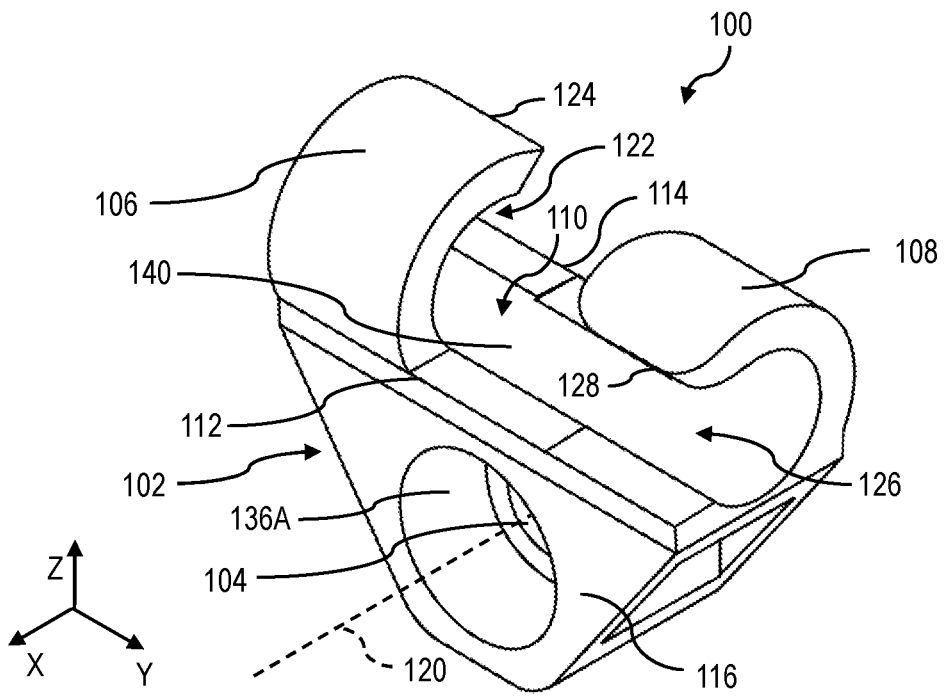
FIGS. 1A-1E depict an example of a cable/tubular clamp.

FIG. 1A is a perspective view of an example cable/tubular clamp 100 (hereinafter "clamp 100"). FIGS. 1B, 1C, 1D, and 1E are respective front, back, right side, and top views of the clamp 100 of FIG. 1A. The clamp 100 generally includes a base 102 with an aperture 104 formed therethrough, a first clamp arm 106, and a second clamp arm 108. The clamp 100 may be a single solid piece of material. The clamp 100 may be a single piece of molded thermoplastic or another polymer, a metal, a metal alloy, or a composite material. The clamp 100 is configured to hold a cable or tubular therein. As an example, the clamp 100 may be configured to hold a coaxial cable therein. As another example, the clamp 100 may be configured to hold a pipe (e.g., PEX and/or PVC pipe) therein. The clamp 100 may be mounted to a structure (e.g., a wall) via a fastener received through the aperture 104.

As illustrated, the base 102 includes an upper surface 110 having a front edge 112 and a back edge 114, a front surface 116 extending downward from the front edge 112 of the upper surface 110, and a back surface 118 extending downward from the back edge 114 of the upper surface 110. It should be understood that the terms "upper," "front," and "back" are terms used to define the relative locations of the corresponding surfaces/edges with respect to each other, and the clamp 100 may ultimately be mounted to a surface in a number of different orientations that do not necessitate, for example, the upper surface 110 facing upward in space. X, Y, and Z axes are shown in FIGS. 1A-4 to aid in the description of the clamp 100. As illustrated, the upper surface 110 of the base 102 of the clamp 100 faces toward the positive Z-axis, the front surface 116 of the base 102 faces toward the positive X-axis, and the back surface 118 of the base 102 faces toward the negative X-axis.

The aperture 104 generally extends through the base 102 of the clamp 100 in a direction (e.g., aligned with axis 120 in FIG. 1A) from the front surface 116 to the back surface 118. As illustrated, this direction of the aperture 104 may be parallel to the X-axis. As such, a fastener may be received into the aperture 104 from a first end of the aperture 104 (e.g., at the front surface 116) such that a distal end (e.g., a threaded end) of the fastener extends through the thickness of the base 102 and out a second end of the aperture 104 (e.g., at the back surface 118). The fastener may attach the clamp 100 to a structure proximate the back surface 118 of the base 102.

The first clamp arm 106 may extend from the front edge 112 of the upper surface 110 of the base 102. As illustrated, the first clamp arm 106 extends from the upper surface 110 in a direction toward the back edge 114 of the upper surface 110 of the base 102. The first clamp arm 106 does not reach entirely to the back edge 114 of the upper surface 110. Instead, a space 122 exists between the back edge 114 of the upper surface 110 and an extended end (e.g., distal end) 124 of the first clamp arm 106.

The second clamp arm 108 may extend from the back edge 114 of the upper surface 110 of the base 102 in a direction toward the front edge 112 of the upper surface. Similar to the first clamp arm 106, the second clamp arm 108 extends such that a space 126 exists between the front edge 112 of the upper surface 110 and an extended end (e.g., distal end) 128 of the second clamp arm 108.

The first clamp arm 106 and the second clamp arm 108 are sized to receive a cable or tubular through the spaces 122 and 126 and to hold the cable or tubular against the base 102. As illustrated, the first clamp arm 106 and the second clamp arm 108 extend from opposite front and back sides of the base 102. The clamp arms 106 and 108 may wrap partially around a cable or tubular in opposite directions. As such, the clamp 100 has a reversed direction clamping mechanism to hold a cable or tubular in place, for example, for subsequent mounting of the cable or tubular to a structure.

Details and variations of the base 102 of the clamp 100 will now be described. In certain embodiments, the front surface 116 of the base 102 may be substantially flat (e.g., an unrounded face existing in a single plane). Additionally, in certain embodiments the back surface 118 of the base 102 may be substantially flat (e.g., an unrounded face existing in a single plane). As illustrated, the front surface 116 and the back surface 118 may be substantially parallel with each other. In other embodiments, one or both of the front surface 116 and the back surface 118 may not be entirely planar but instead feature one or more rounded portions or a stepped profile.

The base 102 may be any desired shape. The front surface 116 and the back surface 118 may have substantially the same shape when viewed from a direction perpendicular to the front surface 116 and the back surface 118 (e.g., a direction parallel to the X-axis). In other embodiments, the front surface 116 and the back surface 118 may have different shapes. In certain embodiments, the front surface 116 and the back surface 118 of the base 102, when viewed from this perpendicular direction, may be triangular shaped, truncated triangular shaped (with or without one or more rounded vertices), substantially triangular shaped with one or more rounded vertices, trapezoidal shaped, or substantially trapezoidal shaped with one or more rounded vertices. For example, in FIGS. 1B and 1C the base 102 has a substantially trapezoidal shape with two rounded vertices 130A and 130B at a lower surface 132 of the base 102. In certain embodiments, the front surface 116 and the back surface 118, when viewed from the direction perpendicular thereto, may be rectangular shaped or substantially rectangular shaped with one or more rounded corners. For example, in FIG. 2 the base 102 has a substantially rectangular shape. In certain embodiments, the front surface 116 and the back surface 118, when viewed from the direction perpendicular thereto, may have a substantially rounded shape. For example, in FIG. 3 the base 102 has a substantially rounded shape that extends downward from the upper surface 110 and follows a curve along its lower surface 134. Other shapes than those explicitly described herein or illustrated in the figures may be used for the base 102 in other embodiments.

As illustrated in FIGS. 1A-1C, 2, and 3, the base 102 may include one or more counterbores 136 (e.g., 136A, 136B) formed therein. The counterbore(s) 136 may be configured to receive a head of a fastener positioned through the aperture 104. Any one of the counterbore(s) 136 may hold the fastener in contact with the clamp 100. As illustrated, the counterbore(s) 136 may be concentric with the aperture 104 and have a diameter greater than the diameter of the aperture 104.

Figure 1B:
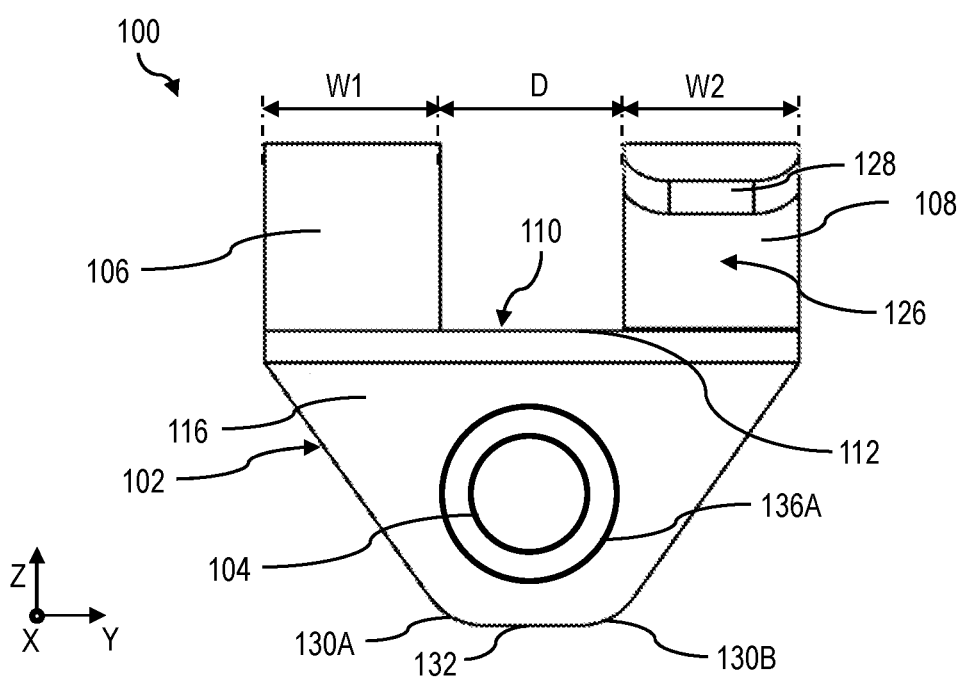
Figure 1C:
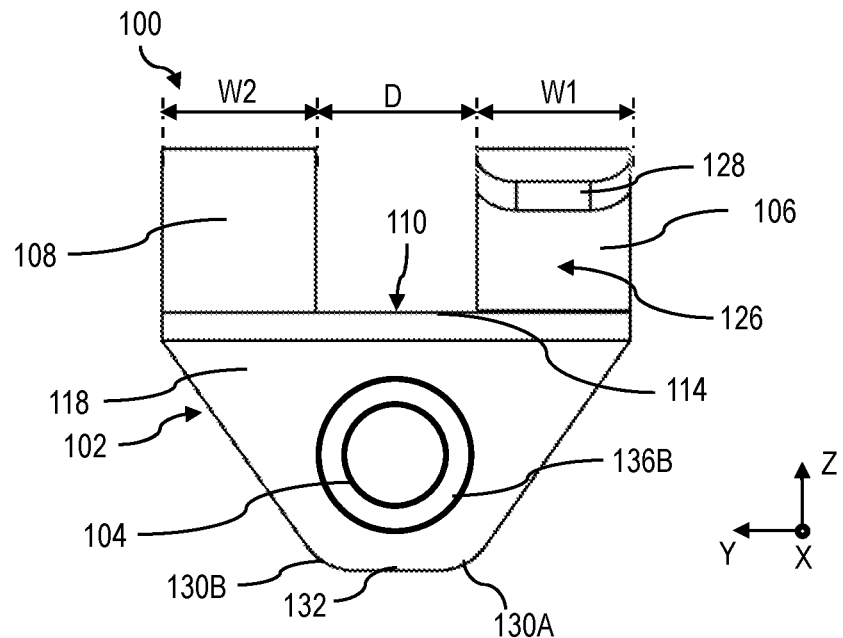

As shown in FIGS. 1A and 1B, the base 102 may include a first counterbore 136A formed therein, the first counterbore 136A extending from the front surface 116 of the base 102 toward (but not reaching) the back surface 118 of the base 102. As shown in FIG. 1C, the base 102 may also include a second counterbore 136B formed therein, the second counterbore 136B extending from the back surface 118 of the base 102 toward (but not reaching) the front surface 116 of the base 102. In clamps 100 having two counterbores 136 (e.g., as shown in FIGS. 1A-1E), each counterbore 136 stops short of a central portion of the base 102 where the smaller diameter aperture 104 continues through the full thickness of the base 102. Having two oppositely facing counterbores 136A and 136B allows the clamp 100 to be mounted to a surface in either direction via a fastener received through either side of the base 102. As illustrated, the first counterbore 136A and the second counterbore 136B may have the same or a substantially equivalent diameter (e.g., less than 1% difference). In other embodiments, the first counterbore 136A may have a diameter that is different than the diameter of the second counterbore 136B, thus allowing different types or sizes of fasteners to be used to mount the clamp 100 to a structure.

Details and variations of the clamp arms 106, 108 of the clamp 100 will now be described. In certain embodiments, the first clamp arm 106 and the second clamp arm 108 are spaced from each other in a direction perpendicular to the direction of the aperture 104 (e.g., direction parallel to the Y-axis). As shown in FIGS. 1B and 1C, the clamp arms 106, 108 are spaced from each other in this direction by a distance D. As illustrated in FIGS. 1B and 1C, the clamp arms 106, 108 may have widths W1, W2, respectively, in the direction perpendicular to the direction of the aperture 104 (e.g., direction parallel to the Y-axis). This allows the clamp arms 106, 108 to more fully grasp a cable or tubular positioned therein, preventing the cable or tubular from accidentally popping out of the clamp 100. The width W1 of the first clamp arm 106 may be approximately equal to the width W2 of the second clamp arm, as shown. In other embodiments, the width W1 of the first clamp arm 106 may be different than the width W2 of the second clamp arm 108. As illustrated, the distance D between the first and second clamp arms 106, 108 may be approximately equal to the width W1, W2 of each of the clamp arms 106, 108. This ratio of the width of the clamp arms 106, 108 to the distance between the clamp arms 106, 108 may facilitate relatively easy insertion of a cable or tubular into the clamp 100 while securing the cable or tubular within the clamp arms 106, 108 such that it cannot easily pop out of the clamp 100. The widths W1, W2 and distance D may be preselected based on a diameter of the cable or tubular to be secured within the clamp 100. In certain embodiments, the widths W1, W2 and distance D may each be between approximately 0.25 cm and 3 cm, more particularly between approximately 0.5 cm and 1 cm, or more particularly between approximately 0.65 cm and 0.75 cm.

Figure 1D:
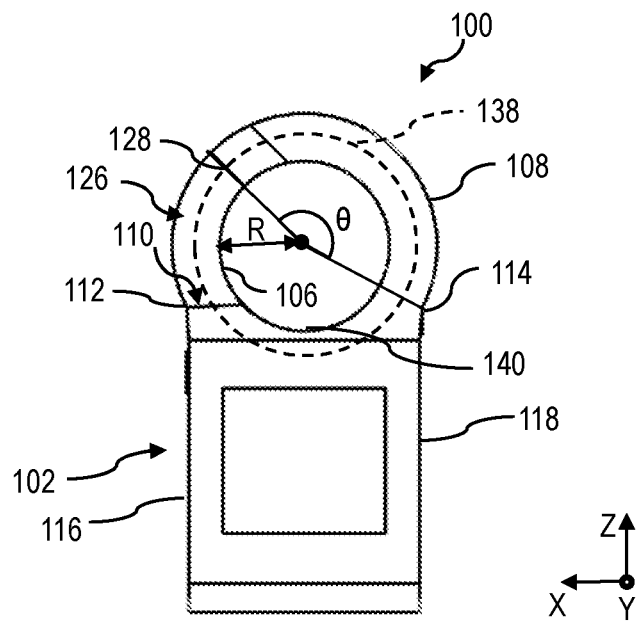
Figure 1E:
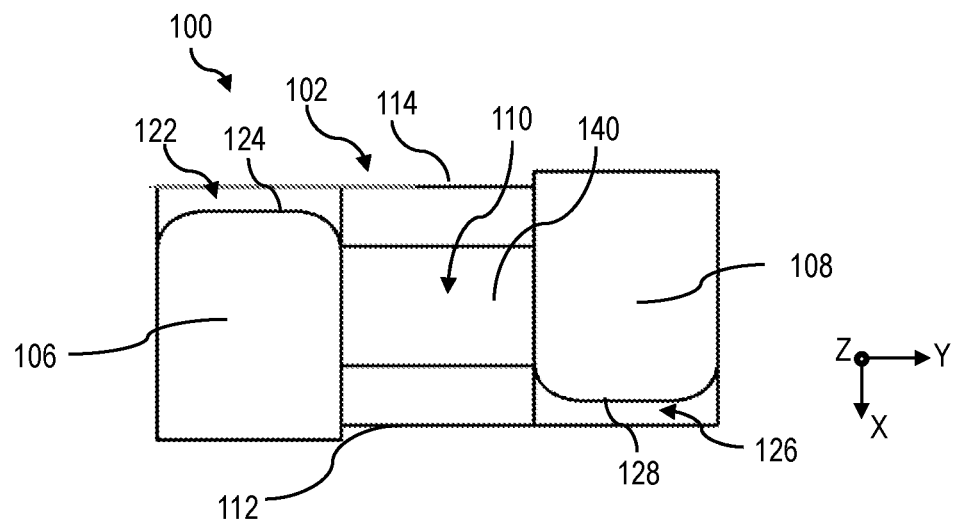
Figure 2:
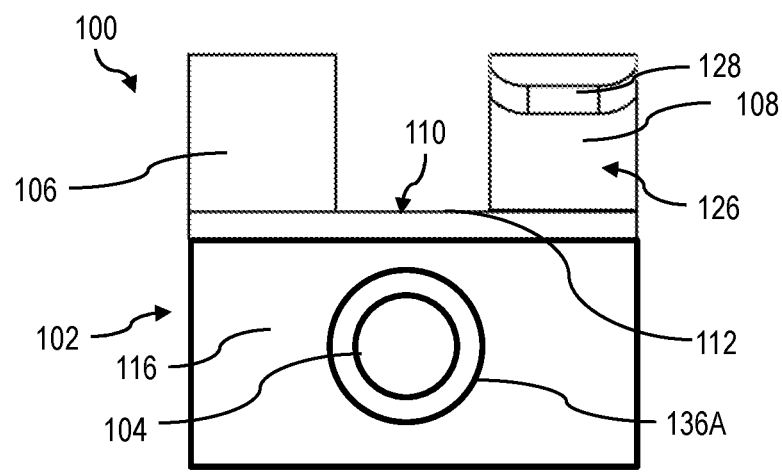
FIG. 2 depicts another example of a cable/tubular clamp.
Figure 3:
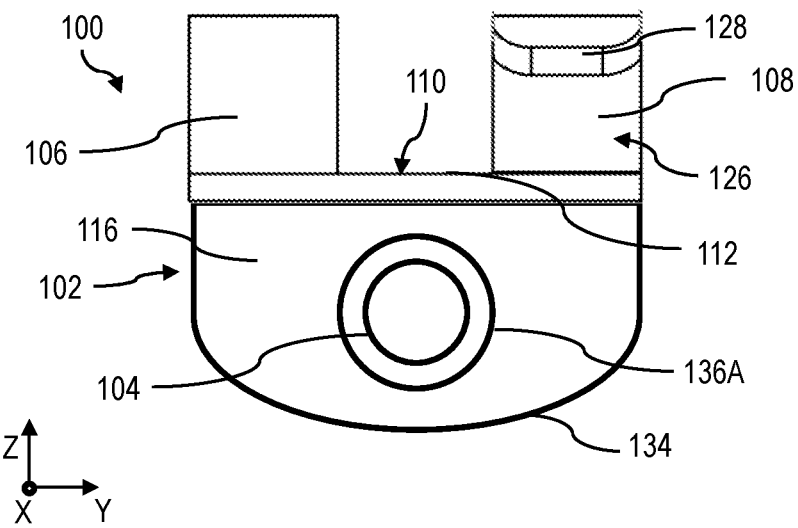
FIG. 3 depicts another example of a cable/tubular clamp.

As illustrated, the first and second clamp arms 106, 108 may each have a rounded shape. The first and second clamp arms 106, 108 may have the rounded shape when viewed from the direction perpendicular to the aperture 104 (e.g., parallel to the Y-axis). For example, as shown in FIG. 1D, the first and second clamp arms 106, 108 may each follow a circular path 138 when viewed in the direction perpendicular to the aperture 104. The first clamp arm 106 may follow the circular path 138 in a first direction over an arc angle (not completing the circle) from the front edge 112 of the upper surface 110 of the base 102 toward the back edge 114 of the upper surface 110. The second clamp arm 108 may follow the circular path 138 in an opposite direction over an arc angle (not completing the circle) from the back edge 114 of the upper surface 110 toward the front edge 112 of the upper surface 110. The arc angle for the second clamp arm 108 is depicted in FIG. 1D as angle θ. The arc angle for the first clamp arm 106 may be approximately equal to the arc angle for the second clamp arm 108, as shown in FIG. 1A. In an embodiment, the arc angles for both clamp arms 106, 108 may be between approximately 135 degrees and 180 degrees, more particularly between approximately 145 degrees and 175 degrees, or more particularly between approximately 155 degrees and 165 degrees.

As shown in FIGS. 1A and 1D, the upper surface 110 of the base 102 of the clamp 100 may have a concave portion 140 between the front edge 112 and the back edge 114 of the upper surface 110. When viewed from a direction perpendicular to the direction of the aperture 104 (e.g., as in FIG. 1D), this concave portion 140 of the upper surface 110 has a concave shape following the circular path 138. This concave portion 140 may provide good contact between the cable or tubular (once received into the clamp arms 106, 108) and the base 102, creating a secure connection. It should be noted that an inner radius R of the rounded clamp arms 106, 108, which may be the same as an inner radius of the concave portion 140, may be less than or equal to an outer diameter of the cable or tubular to be placed into the clamp 100. This sizing may provide a secure connection between the clamp 100 and the cable or tubular as the cable or tubular is partially compressed within the space surrounded by the clamp arms 106, 108.

Although the entirety of the clamp arms 106, 108 are illustrated as being rounded in shape, in other embodiments the clamp arms 106, 108 may have an inner radius that follows a rounded shape (to receive a cable or tubular) and one or more external surfaces that are squared off or otherwise not fully rounded. Although the clamp arms 106, 108 are shown as following a circular path 138, in other embodiments the clamp arms 106, 108 may follow a rounded path having a non-circular shape, such as an elliptical path or an oval path.

Figure 4:
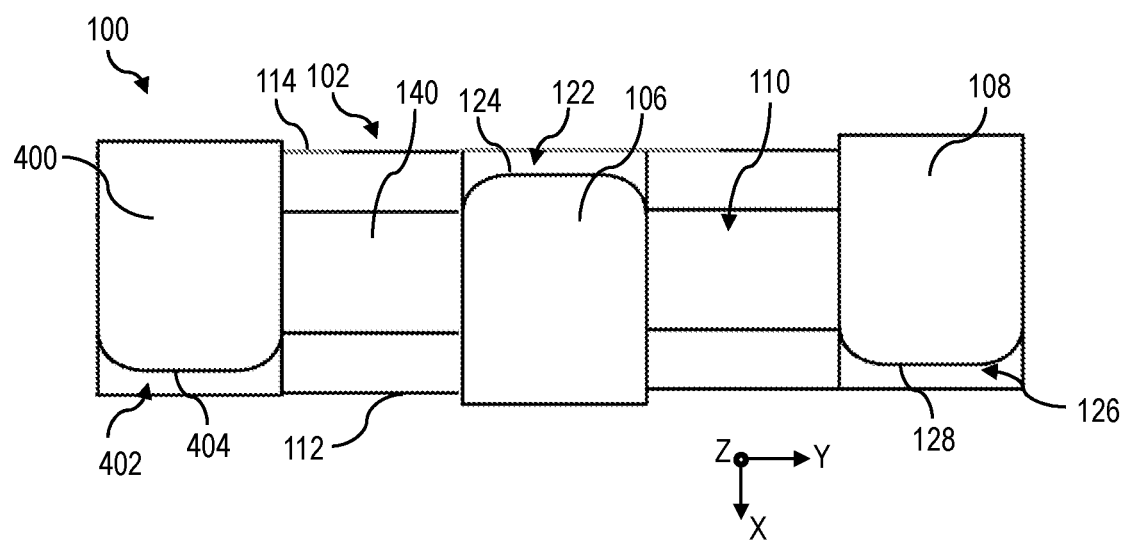
FIG. 4 depicts another example of a cable/tubular clamp.

FIGS. 1A-3 illustrate embodiments of the clamp 100 having two clamp arms 106, 108. However, it should be noted that other embodiments may include other numbers of clamp arms greater than two. For example, FIG. 4 is a top view of an embodiment of the clamp 100 having three clamp arms 106, 108, and 400. The third clamp arm 400, similar to the second clamp arm 108, may extend from the back edge 114 of the upper surface 110 in a direction toward the front edge 112 of the upper surface 110 with a space 402 between the front edge 112 of the upper surface and an extended end 404 of the third clamp arm 400. The third clamp arm 400 may be located on an opposite side of the first clamp arm 106 from the second clamp arm 108. In other embodiments, the third clamp arm may be similar in shape to the first clamp arm 106 and located on an opposite side of the second clamp arm 108 from the first clamp arm 106. In either case, the multiple clamp arms are staggered in reversed directions along the length of the upper surface 110 of the base 102, so that a cable or tubular would be weaved between the adjacent clamp arms. Additional clamp arms, as shown in FIG. 4, may provide a more secure connection of a cable or tubular to the clamp 100. Any desired number of clamp arms (greater than one) that are staggered in reversed directions may be used in the disclosed clamp including, for example, two, three, four, five, six, seven, eight, nine, ten, or more clamp arms.

Figure 5:
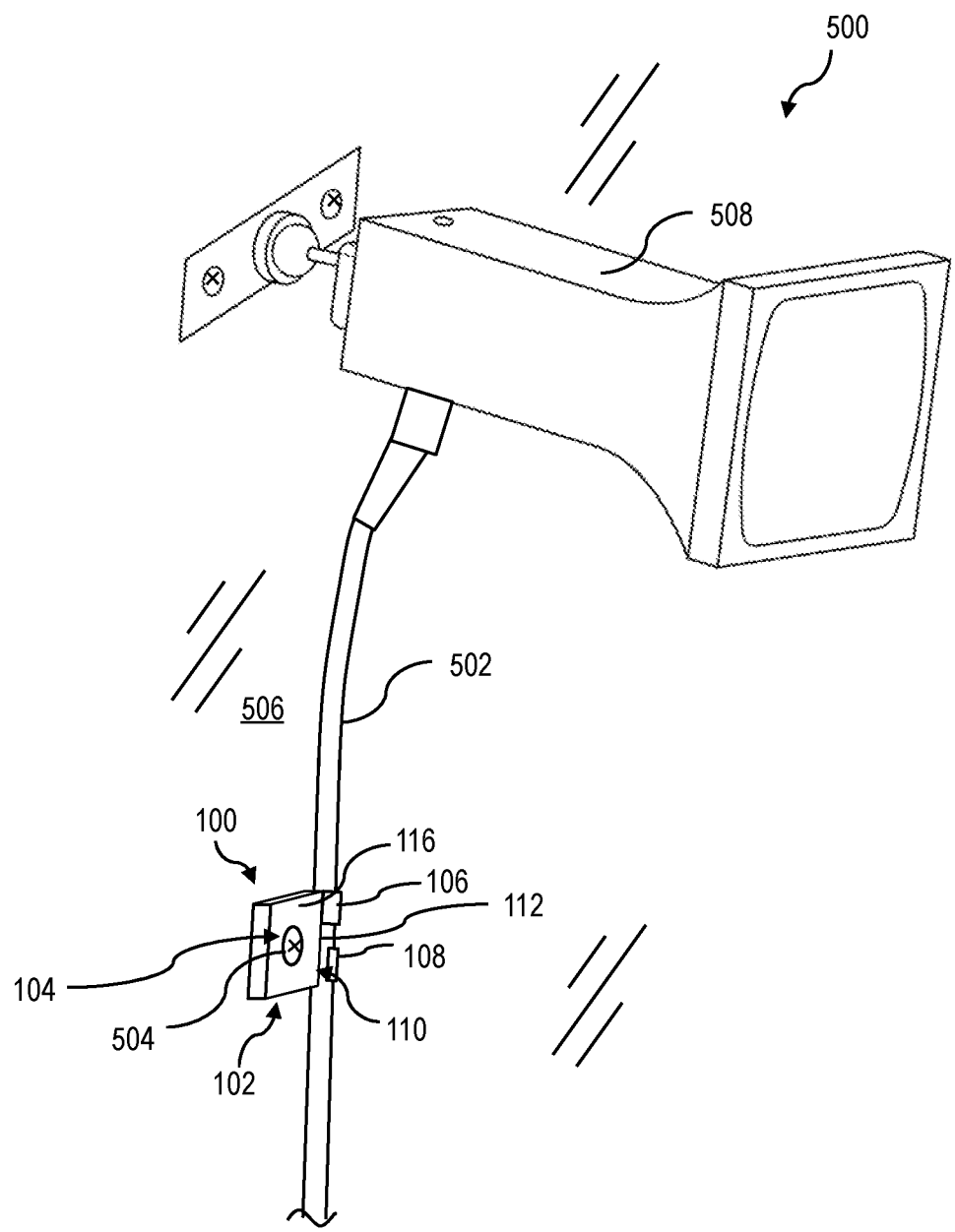
FIG. 5 depicts an example of a system using a cable/tubular clamp to hold a coaxial cable against a wall.

FIG. 5 illustrates a system 500 using the clamp 100 described above. The system 500 includes a cable 502, the clamp 100, and a fastener 504. As illustrated, the cable 502 has been received into the spaces between each of the clamp arms 106, 108 and the upper surface 110 of the base 102. The cable 502 is held within the first clamp arm 106 and the second clamp arm 108. As illustrated, the fastener 504 may be received through the aperture 104 in the base 102 to connect the clamp 100 (with the cable held therein) to a structure 506 (e.g., a wall). The fastener 504 may be a threaded screw, or any other desired type of fastener (e.g., nail, bolt, etc.) capable of securing the clamp 100 to a structure. The fastener 504 extends through the aperture 104 in a direction from the front surface 116 to the back surface 118, such that the back surface 118 faces the structure 506. A flat portion of the back surface 118 may directly contact the structure 506.

The cable 502 may be a coaxial cable. The cable 502 may supply power and/or communication to a device coupled to an end thereof. As shown in FIG. 5, for example, the cable 502 is coupled to a light device 508, which may be configured to operate using power supplied to the light device 508 from the cable 502. As illustrated, the clamp 100 may be relatively small compared to the light device 508. The light device 508 may be mounted to the structure 506, as shown, and it may be desirable to mount the cable 502 used to power the light device 508 to the structure 506 as well. One or more clamps 100 as disclosed herein may be used to secure the cable 502 to the structure 506, thereby preventing the cable 502 from moving about or becoming snagged on something. The cable 502 may provide power and/or communications from a distant source. As such, it may be desirable to use a group of several clamps 100 to secure the cable 502 along one or more structures 506 between the source and the device (e.g., light device 508) being operated. The clamps 100 may be easy to install, since all that is required is positioning the cable 502 under the clamp arms 106, 108 and attaching the clamp 100 to the structure 506 via the fastener 504. This makes it easy to complete a do-it-yourself installation of a device (e.g., light device 508) powered over the cable 502 (e.g., coaxial cable).

Other illustrative embodiments ("Embodiments") are described below:

Embodiment 1: A cable/tubular clamp comprising: a base having an upper surface, a front surface extending downward from a front edge of the upper surface, and a back surface extending downward from a back edge of the upper surface opposite the front edge; an aperture extending through the base in a direction from the front surface to the back surface; a first clamp arm extending from the front edge of the upper surface in a direction toward the back edge of the upper surface with a space between the back edge of the upper surface and an extended end of the first clamp arm; and a second clamp arm extending from the back edge of the upper surface in a direction toward the front edge of the upper surface with a space between the front edge of the upper surface and an extended end of the second clamp arm; wherein the first clamp arm and the second clamp arm are sized to receive a cable or tubular through the spaces and to hold the cable or tubular against the base.

Embodiment 2: The cable/tubular clamp of Embodiment 1, wherein the first and second clamp arms are rounded.

Embodiment 3: The cable/tubular clamp of Embodiment 2, wherein the first and second clamp arms each follow a circular path when viewed from a direction perpendicular to the direction of the aperture.

Embodiment 4: The cable/tubular clamp of Embodiment 3, wherein: the first clamp arm follows the circular path over an arc angle of between 145 degrees and 175 degrees from the front edge of the upper surface toward the back edge of the upper surface; and the second clamp arm follows the circular path over an arc angle of between 145 degrees and 175 degrees from the back edge of the upper surface toward the front edge of the upper surface.

Embodiment 5: The cable/tubular clamp of Embodiment 3, wherein the upper surface of the base comprises a concave shape between the front edge and the back edge, the concave shape following the circular path when viewed from the direction perpendicular to the direction of the aperture.

Embodiment 6: The cable/tubular clamp of Embodiment 1, wherein the first clamp arm and the second clamp arm are spaced from each other in a direction perpendicular to the direction of the aperture.

Embodiment 7: The cable/tubular clamp of Embodiment 6, wherein: the first clamp arm and the second clamp arm each have a width in the direction perpendicular to the direction of the aperture; the width of the first clamp arm is approximately equal to the width of the second clamp arm; and a distance between the first and second clamp arms in the direction perpendicular to the direction of the aperture is approximately equal to the width of each of the first clamp arm and the second clamp arm.

Embodiment 8: The cable/tubular clamp of Embodiment 1, wherein the base comprises a first counterbore formed therein, the first counterbore extending from the front surface of the base toward the back surface of the base.

Embodiment 9: The cable/tubular clamp of Embodiment 8, wherein the base comprises a second counterbore formed therein, the second counterbore extending from the back surface of the base toward the front surface of the base.

Embodiment 10: The cable/tubular clamp of Embodiment 9, wherein the first counterbore has a first diameter and the second counterbore has a second diameter substantially equal to the first diameter.

Embodiment 11: The cable/tubular clamp of Embodiment 1, wherein the front surface is substantially flat, the back surface is substantially flat, or both.

Embodiment 12: The cable/tubular clamp of Embodiment 1, wherein the front surface and the back surface, when viewed from a direction parallel to the direction of the aperture, are triangular shaped, truncated triangular shaped, substantially triangular shaped with one or more rounded vertices, trapezoidal shaped, or substantially trapezoidal shaped with one or more rounded vertices.

Embodiment 13: The cable/tubular clamp of Embodiment 1, wherein the front surface and the back surface, when viewed from a direction parallel to the direction of the aperture, are rectangular shaped or substantially rectangular shaped with two or more rounded corners.

Embodiment 14: The cable/tubular clamp of Embodiment 1, wherein the front surface and the back surface, when viewed from a direction parallel to the direction of the aperture, have a substantially rounded shape.

Embodiment 15: The cable/tubular clamp of Embodiment 1, further comprising a third clamp arm extending from the back edge of the upper surface in a direction toward the front edge of the upper surface with a space between the front edge of the upper surface and an extended end of the third clamp arm, wherein the third clamp arm is located on an opposite side of the first rounded clamp arm from the second clamp arm.

Embodiment 16: The cable/tubular clamp of Embodiment 1, wherein the front and back surfaces are substantially parallel with each other Embodiment 17: A system, comprising: a cable or tubular; a cable/tubular clamp comprising: a base having an upper surface, a front surface extending downward from a front edge of the upper surface, and a back surface extending downward from a back edge of the upper surface opposite the front edge; an aperture extending through the base in a direction from the front surface to the back surface; a first clamp arm extending from the front edge of the upper surface in a direction toward the back edge of the upper surface with a space between the back edge of the upper surface and an extended end of the first clamp arm for receiving the cable or tubular into the first clamp arm; and a second clamp arm extending from the back edge of the upper surface in a direction toward the front edge of the upper surface with a space between the front edge of the upper surface and an extended end of the second clamp arm for receiving the cable or tubular into the second clamp arm; and a fastener configured to be received through the aperture to connect the cable/tubular clamp to a structure.

Embodiment 18: The system of Embodiment 17, wherein the first and second clamp arms are rounded and each follow a circular path when viewed from a direction perpendicular to the direction of the aperture, wherein an inner diameter of each of the first and second clamp arms is less than or equal to an outer diameter of the cable or tubular.

Embodiment 19: The system of Embodiment 17, wherein the cable is a coaxial cable.

Embodiment 20: The system of Embodiment 19, further comprising a light device configured to be powered via the coaxial cable.

Embodiment 21: The system of Embodiment 17, wherein the fastener comprises a threaded screw.

Embodiment 22: The system of Embodiment 17, wherein the base comprises at least one counterbore formed therein for receiving a head of the fastener.

Embodiment 23: A method for mounting a cable or tubular to a structure, comprising: holding the cable or tubular within a first clamp arm of a cable/tubular clamp and a second clamp arm of the cable/tubular clamp, the cable/tubular clamp comprising: a base having an upper surface, a front surface extending downward from a front edge of the upper surface, and a back surface extending downward from a back edge of the upper surface opposite the front edge; the first clamp arm extending from the front edge of the upper surface around the cable or tubular in a direction toward the back edge of the upper surface; and the second clamp arm extending from the back edge of the upper surface around the cable or tubular in a direction toward the front edge of the upper surface; and attaching the cable/tubular clamp to the structure via a fastener extending through an aperture formed through the base of the cable/tubular clamp in a direction from the front surface to the back surface.

Embodiment 24: The method of Embodiment 23, further comprising holding the fastener in contact with the cable/tubular clamp via a counterbore formed in the base of the cable/tubular clamp.

Embodiment 25: The method of Embodiment 23, further comprising contacting a substantially flat portion of the back surface of the cable/tubular clamp directly with the structure.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A system, comprising:
   a cable, wherein the cable is a coaxial cable;
   a cable clamp comprising:
      a base having an upper surface, a front surface extending downward from a front edge of the upper surface, and a back surface extending downward from a back edge of the upper surface opposite the front edge;
      an aperture extending through the base in a direction from the front surface to the back surface;
      a first clamp arm extending from the front edge of the upper surface in a direction toward the back edge of the upper surface with a first space between the back edge of the upper surface and an extended end of the first clamp arm for receiving the cable into the first clamp arm; and
      a second clamp arm extending from the back edge of the upper surface in a direction toward the front edge of the upper surface with a second space between the front edge of the upper surface and an extended end of the second clamp arm for receiving the cable into the second clamp arm;
   a fastener configured to be received through the aperture to connect the cable clamp to a structure; and
   a light device configured to be powered via the coaxial cable.

2. The system of claim 1, wherein the first clamp arm and the second clamp arm are rounded and each follow a circular path when viewed from a direction perpendicular to the direction of the aperture, and wherein an inner diameter of each of the first clamp arm and the second clamp arm is less than or equal to an outer diameter of the cable.

3. The system of claim 1, wherein the fastener comprises a threaded screw.

4. A system, comprising:
   a cable;
   a cable clamp comprising:
      a base having an upper surface, a front surface extending downward from a front edge of the upper surface, and a back surface extending downward from a back edge of the upper surface opposite the front edge;
      an aperture extending through the base in a direction from the front surface to the back surface;
      a first clamp arm extending from the front edge of the upper surface in a direction toward the back edge of the upper surface with a first space between the back edge of the upper surface and an extended end of the first clamp arm for receiving the cable into the first clamp arm; and
      a second clamp arm extending from the back edge of the upper surface in a direction toward the front edge of the upper surface with a second space between the front edge of the upper surface and an extended end of the second clamp arm for receiving the cable into the second clamp arm;
   a fastener configured to be received through the aperture to connect the cable clamp to a structure; and
   a light device configured to be powered via the cable.

5. The system of claim 4, wherein the first clamp arm and the second clamp arm are rounded.

6. The system of claim 5, wherein the first clamp arm and the second clamp arm each follow a circular path when viewed from a direction perpendicular to the direction of the aperture.

7. The system of claim 6, wherein:
   the first clamp arm follows the circular path over an arc angle of between 145 degrees and 175 degrees from the front edge of the upper surface toward the back edge of the upper surface; and
   the second clamp arm follows the circular path over an arc angle of between 145 degrees and 175 degrees from the back edge of the upper surface toward the front edge of the upper surface.

8. The system of claim 6, wherein the upper surface of the base comprises a concave shape between the front edge and the back edge, the concave shape following the circular path when viewed from the direction perpendicular to the direction of the aperture.

9. The system of claim 4, wherein the first clamp arm and the second clamp arm are spaced from each other in a direction perpendicular to the direction of the aperture.

10. The system of claim 9, wherein:
the first clamp arm and the second clamp arm each have a width in the direction perpendicular to the direction of the aperture;
the width of the first clamp arm is approximately equal to the width of the second clamp arm; and
a distance between the first clamp arm and the second clamp arm in the direction perpendicular to the direction of the aperture is approximately equal to the width of each of the first clamp arm and the second clamp arm.

11. The system of claim 4, wherein the base comprises a first counterbore formed therein, the first counterbore extending from the front surface of the base toward the back surface of the base.

12. The system of claim 11, wherein the base comprises a second counterbore formed therein, the second counterbore extending from the back surface of the base toward the front surface of the base.

13. The system of claim 12, wherein the first counterbore has a first diameter and the second counterbore has a second diameter substantially equal to the first diameter.

14. The system of claim 4, wherein the front surface is substantially flat, the back surface is substantially flat, or both.

15. The system of claim 4, wherein the front surface and the back surface, when viewed from a direction parallel to the direction of the aperture, are triangular shaped, truncated triangular shaped, substantially triangular shaped with one or more rounded vertices, trapezoidal shaped, or substantially trapezoidal shaped with one or more rounded vertices.

16. The system of claim 4, wherein the front surface and the back surface, when viewed from a direction parallel to the direction of the aperture, are rectangular shaped or substantially rectangular shaped with two or more rounded corners.

17. The system of claim 4, wherein the front surface and the back surface, when viewed from a direction parallel to the direction of the aperture, have a substantially rounded shape.

18. The system of claim 4, further comprising a third clamp arm extending from the back edge of the upper surface in a direction toward the front edge of the upper surface with a third space between the front edge of the upper surface and an extended end of the third clamp arm, wherein the third clamp arm is located on an opposite side of the first clamp arm from the second clamp arm.

* * * * *